Nov. 3, 1925.
F. H. LIPPINCOTT
AUTOMATIC DRIVE
Filed March 1, 1924
1,560,267
2 Sheets-Sheet 1
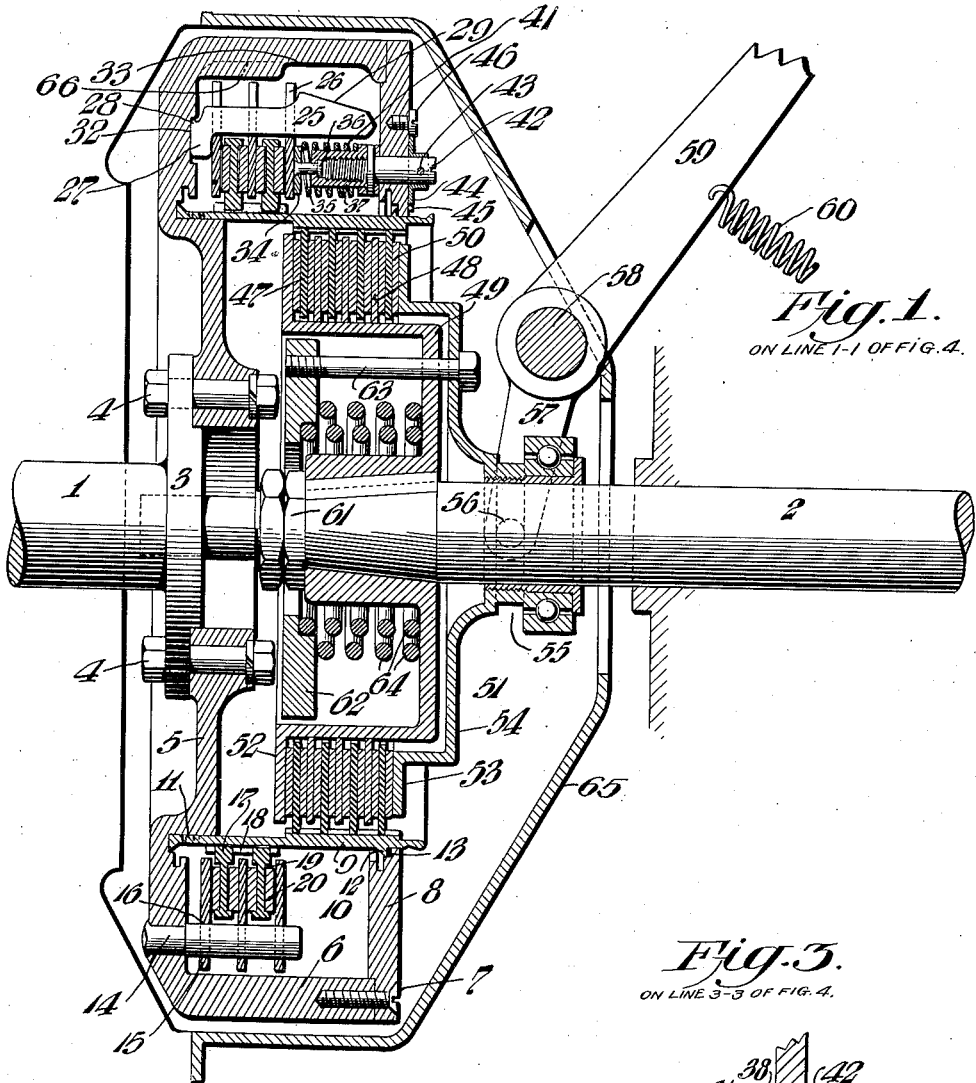
INVENTOR:
Fisher H. Lippincott
BY
J. Bonsall Taylor
Herbert S. Fairbanks
ATTORNEYS.

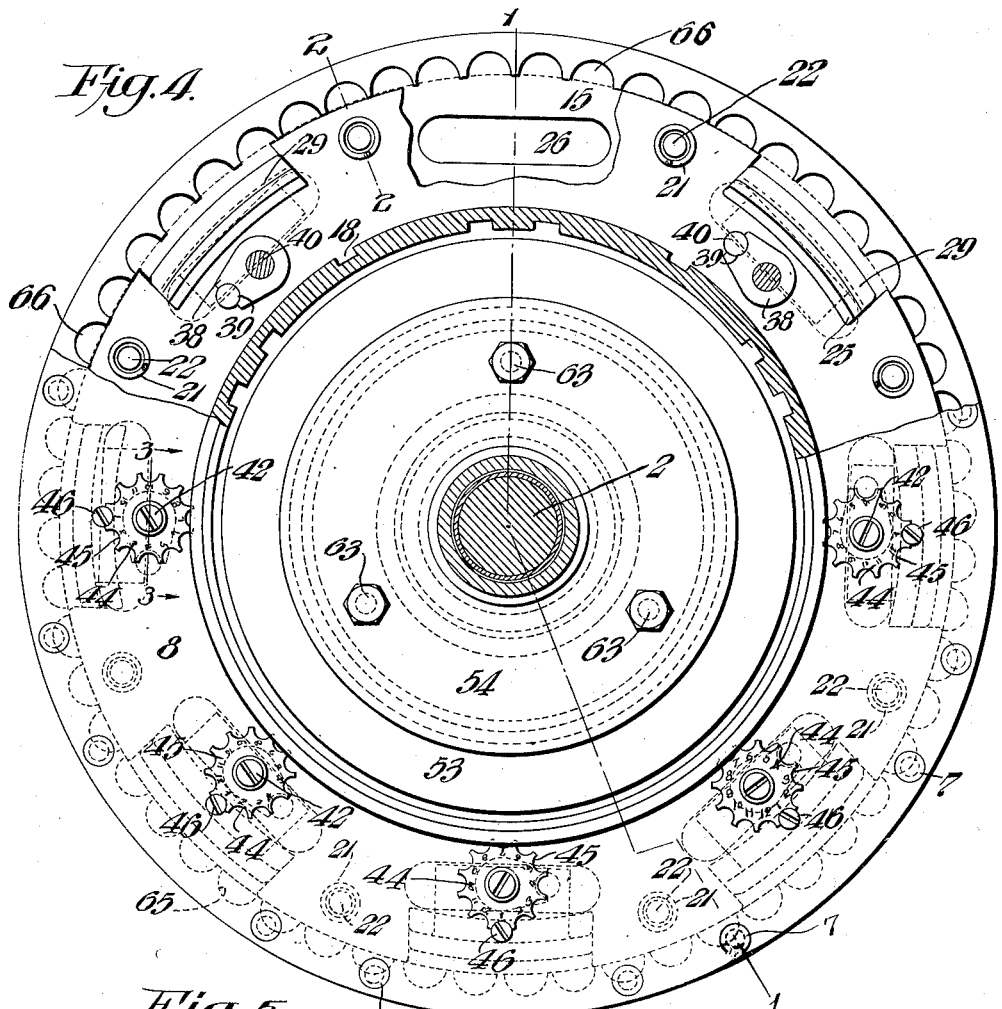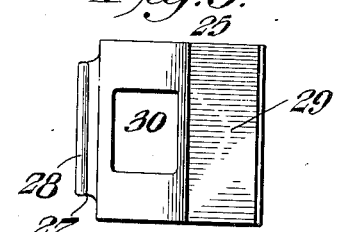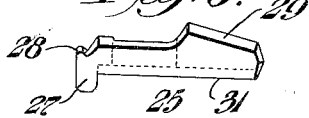

Patented Nov. 3, 1925.

1,560,267

UNITED STATES PATENT OFFICE.

FISHER H. LIPPINCOTT, OF PHILADELPHIA, PENNSYLVANIA.

AUTOMATIC DRIVE.

Application filed March 1, 1924. Serial No. 696,125.

*To all whom it may concern:*

Be it known that I, FISHER H. LIPPINCOTT, a citizen of the United States, residing at Philadelphia, county of Philadelphia, State of Pennsylvania, have invented a new and useful Automatic Drive, of which the following is a specification.

My present invention comprehends a novel construction and arrangement of an automatic drive wherein driving and driven friction elements are automatically controlled by means of centrifugally acting members in order to vary the power and speed relationship between the driving and the driven members, and wherein means are also provided to take up and compensate for the wear of the friction elements incident to their use.

It further comprehends a novel construction and arrangement of driving and driven friction discs, a novel construction of centrifugally controlled levers and novel means for mounting them, a novel construction and arrangement of mechanism for taking up wear, together with novel means for locking said mechanism in the position to which it has been adjusted.

In illustrating my invention, I have shown it in conjunction with a manually controlled clutch of the multiple disc friction type which, if desired, can be dispensed with, and the driven friction discs of the automatic control can be operatively connected with the driven member or the driven shaft in any desired manner.

It further comprehends a novel construction and arrangement of clutch drum which contributes with the fly wheel and with an end closure to form an oil receiving chamber within which the automatically controlled friction elements are mounted.

It further consists of other novel features of construction and advantage all as will be hereinafter fully set forth.

For the purpose of illustrating my invention, I have shown in the accompanying drawings a typical embodiment thereof which is at present preferred by me since this embodiment has been found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a section on line 1—1 of Figure 4, of an automatic drive, embodying my invention.

Figure 2 represents a section on line 2—2 of Figure 4.

Figure 3 represents a section on line 3—3 of Figure 4.

Figure 4 represents an end elevation, partly broken away.

Figure 5 represents a top plan view of one of the centrifugally controlled members in detached position.

Figure 6 represents a perspective view of the member seen in Figure 5.

Similar numerals of reference indicate corresponding parts.

Referring to the drawings.

In one of my prior patents No. 1,440,160, I have described and broadly claimed a novel construction and arrangement of an automatic drive which contributes to form the driving connection between a driving and a driven member, and wherein the friction elements are controlled by centrifugally actuated members, and wherein means are provided to take up and compensate for the wear on the friction elements.

In accordance with my present invention, the construction has been simplified and improved in many features which will hereinafter clearly appear.

1 designates a driving member, which in practice may be the engine or driving shaft. 2 designates the driven member, which may be the driven shaft. The driving member 1 is provided with a head 3, to which is secured, by means of the fastening devices 4, a fly wheel 5. The fly wheel 5, at its periphery, is provided with a laterally extending flange 6, to which is secured by means of fastening devices 7, an end ring or closure 8 which serves to secure in assembled position a clutch drum 9. It will thus be seen that the fly wheel 5, its flange 6, the end closure 8 and the clutch drum 9 contribute to form an oil receiving chamber 10. The clutch drum 9 at one end portion is mounted on a shoulder 11 on the fly wheel 5, and near its outer end is provided with a peripheral rib 12 forming a shoulder against which the end closure 8 bears to secure the clutch drum 9 in assembled position. A packing strip 13 is preferably employed between this rib 12 and the end closure 8.

The fly wheel 5 is provided with a desired number of driving pins or studs 14 which extend into the oil receiving chamber 10 and receive a set of driving discs 15, which are apertured, as at 16, in order that such driving friction discs will be free to move laterally. 17 designates a set of driven friction discs which are keyed, as at 18, to the outer periphery of the clutch drum 9 and these driven friction discs are disposed between the driving friction discs. Each friction disc of the set of driven friction discs 17 is recessed on opposite sides, as at 19, in order to receive and position the intermediate friction rings 20. The driving friction disc, of the set of driving friction discs 15 which is nearest to the fly wheel 5, is subjected to the action of a desired number of springs 21 which surround the pins 22 carried by the first of the driving friction discs. The end closure 8 is preferably recessed, as at 23, in order to receive one end of springs 21, see Figure 2.

It will be seen from Figure 4 that I have illustrated eight of these springs 21 and their adjuncts as being employed, and as being circumferentially spaced from each other. The springs 21, as seen in Figure 2, pass through apertures 24 in certain of the driving discs 15. 25 designates centrifugally controlled levers which are positioned in slots 26 in the set of driving friction discs 15. The detailed construction of these levers will be best understood by reference to Figures 5 and 6, from which it will be seen that each lever 25 is provided at one end with a subtantially rectangular shaped lug 27 having at its outer edge an outwardly extending elongated fulcrum 28. The free end or forward end of each lever 25 has its outer face inwardly inclined or bevelled, as at 29, and this end forms a weighted end. The effective weight of each lever is reduced by an aperture 30 formed intermediate its ends. The bottom face of a lever 25 extending from the lug 27, which forms the fulcrum portion of the lever, is preferably substantially straight, as indicated at 31. The fulcrum portion formed by the lug 27 is received in a recess 32 formed in the inner face of the fly wheel 5, and the flange 6 is provided with a number of recesses 33 corresponding in number to the number of levers 25 employed, in order that the desired stroke under centrifugal action will be permitted of said levers 25.

The outer driving friction disc of the set of driving friction discs 15 is engaged by the pressure transmitting heads 34 carried by the plunger rods 35 each of which has a head 36 which is slidable within an internally threaded nut 37, the nut 37 being provided with an outwardly extending flange 38 which is recessed, as at 39, in order to pass partially over a pin 40 carried by the end closure plate 8. Springs 41 are interposed between the flanges 38 of the nuts 37 and the pressure transmitting heads 34 of the plungers 36.

42 designates adjusting screws which are in threaded engagement with the nuts 37. These adjusting screws 42 have a bearing in and extend through the end closure 8, and have fixed to them in any desired manner, for example, by means of pins 43, locking members 44, in the form of discs having recesses 45 in their peripheries. The longitudinal movement of screws 42 is prevented by the provision of inner flanges and the locking members 44. A locking member 46 is provided in the form of a screw, the head of which when the screw is in place being received in a recess 45 of its respective locking member 44 to retain the screw 42 and thereby the nut 37 and its adjuncts in the position to which they have been adjusted. It will thus be seen that the nut 37 is capable of longitudinal movement, but its relative rotation with respect to its adjusting screw 42 is prevented. It will be seen that a clearance is provided between the pressure transmitting heads 34 and the ends of the nuts 37 in which they are mounted, see more particularly Figures 1 and 3.

The clutch drum 9 has keyed to its inner periphery, so as to be laterally movable thereon, a set of friction discs 47 which cooperate with a set of friction discs 48 which are keyed to an inner clutch drum 49 so as to be laterally movable thereon. A third set of friction discs 50 is provided, disposed between the friction discs 47 and 48, and may be loosely mounted or connected with either the friction discs 47 or the friction discs 48. These friction discs 47, 48 and 50 contribute to form a manually controlled clutch 51 and are disposed between the flange 52 of the inner clutch drum and the flange 53 of the clutch disc 54 which latter forms a pressure transmitting disc, and is provided with a clutch collar 55 into which extend the clutch pins 56 of the clutch arms 57 which are mounted on a rock shaft 58, on which latter is also mounted a clutch lever 59 which is under the control of the operator of the vehicle, and is usually connected with a foot pedal for operating it. A spring 60 is provided which tends to maintain the clutch lever 59 in the position seen in Figure 1. The inner clutch drum 49 is secured to the driven shaft 2 by means of the nuts 61, one of which serves as a lock nut. 62 designates a follower ring to which is connected the ends of the bolts 63 which pass through the rear end of the inner clutch drum 49 and through the clutch disc 54. Springs 64 are interposed between the follower ring 62 and the inner clutch drum 49.

65 designates an outer housing which is suitably apertured to permit the driving and driven members and the clutch levers to pass therethrough. The inner periphery of the flange 6 is provided with the laterally extending pockets or recesses 66 which aid in distributing the lubricant contained within the oil receiving chamber 10.

The operation of the automatic drive will now be apparent to those skilled in this art and is as follows:

The springs 41 are set in their adjusted position in such a manner that the friction discs 15, 17 and 20 will not take hold when the centrifugally controlled levers 25 are in their normal position, as seen in Figure 1. These levers are retained in their normal position by springs 21 until the engine or driving shaft 1 reaches a predetermined speed. As the speed of the engine or, in other words, of the driving shaft 1, increases above the predetermined speed standard of the driving member, the levers 25 move outwardly, due to centrifugal action, thereby causing their lugs 27 to effect the frictional grip between the driving and driven friction discs 15 and 17, respectively, and intermediate discs 20.

As the speed of the driving members decreases or falls to the predetermined standard of speed, the weighted ends of the levers 25 will move inwardly, thereby permitting the springs 21 to move the driving disc of the set of driving discs 15, laterally, and permits the release of the friction of the driving and driven friction discs of the automatic clutch. The manually controlled clutch 51 can be actuated at the will of the operator in the conventional manner which is well known in this art, and a detailed description of such operation is believed to be unnecessary.

In order to provide for taking up wear of the friction elements of the automatic clutch, the screws 46 are unscrewed and the discs 45 turned in a direction to partially rotate their respective adjusting screws 42, thereby effecting lateral movement of their nuts 37 so that the proper take up for wear will be effected. The outward movement of the levers 25 under centrifugal action is limited by the flange 6 of the fly wheel 5. The resilient means employed for taking up wear is bodily adjustable without varying the tension of the springs or in other words it is adjustable as to location without varying its degree of resiliency.

When the maximum strength of the springs 41 is reached, they compress and allow the weights 25 to move to their extreme outward positions. The pressure transmitting heads 34, preferably, do not at any time come into contact with the nuts 37. The discs 44 preferably have their notches or recesses 45 consecutively numbered so that it will indicate to the operator that all of the discs 44 and their adjuncts have the same adjustment. It will be seen that when the tension of the resilient means is relieved the levers 25 can be manually inserted into or removed from their fulcrumed positions.

Having thus described my invention, what I claim as new and desire to secure by Letters Patent, is:

1. In an automatic drive, the combination with a driving member, and a driven member, of a set of driving and a set of driven friction discs contributing to form an operative connection between said members, centrifugally controlled levers operative under centrifugal action to effect lateral displacement of said friction discs to automatically vary the degree of friction between them as the speed of the driving member varies, and resilient means adjustable as to location without varying its degree of resiliency, to limit lateral movement of said discs until the maximum strength of said resilient means is reached, said resilient means then permitting bodily movement of said discs until said levers complete their outward stroke.

2. In an automatic drive, a driving member, a driven member, driving and driven friction discs contributing to form an operative engagement between said members, centrifugally controlled levers, each having an end portion disposed between said driving member and one of said discs and having a fulcrum in bearing engagement with said driving member, and means adjustable as to location without varying its resiliency to retain said lever engaging disc against said levers and thereby the fulcrums of said levers in operative engagement with said driving member when said levers are not under centrifugal action.

3. In an automatic drive, a driving member, a driven member, driving and driven friction discs contributing to form an operative engagement between said members, centrifugally controlled levers, each having an end portion disposed between said driving member and one of said discs and having a fulcrum in bearing engagement with said driving member, resilient means to retain said lever engaging disc against said levers and thereby the fulcrums of said levers in operative engagement with said driving member when said levers are not under centrifugal action, said levers being manually insertible into and removable from their fulcrumed position when the tension of said resilient means is relieved.

4. In an automatic drive, a driving member, a driven member, driving and driven friction discs contributing to form an operative connection between said members, centrifugally controlled levers to effect lateral displacement of said friction discs to automatically vary the degree of friction between them as the speed of said driving member varies, resilient means adjustable as to location without varying its degree of resiliency and having a plurality of sets of relatively movable parts, and a spring between parts of a set, one part of a set resiliently opposing displacement of said discs by said levers, and the other part of a set being adjustable to provide an adjustable abutment for its spring.

5. In an automatic drive, a driving member, a driven member, driving and driven friction discs contributing to form an operative connection between said members, centrifugally controlled levers to effect lateral displacement of said friction discs to automatically vary the degree of friction between them as the speed of said driving member varies, resilient means adjustable as to location without varying its degree of resiliency and having a plurality of sets of relatively movable parts, a spring between parts of a set, one part of a set resiliently opposing displacement of said discs by said levers, and the other part of a set being adjustable to provide an adjustable abutment for its spring, and means to lock the abutment forming parts in the positions to which they have been adjusted.

6. In an automatic drive, a driving member, a driven member, driving and driven friction discs contributing to form an operative connection between said members, centrifugally controlled levers to effect lateral displacement of said friction discs to automatically vary the degree of friction between them as the speed of said driving member varies, resilient means having a plurality of sets of relatively movable parts, a spring between parts of a set, one part of a set resiliently opposing displacement of said discs by said levers, and the other part of a set being adjustable to provide an adjustable abutment for its spring, means to lock the abutment forming parts in the positions to which they have been adjusted, said locking means having indicia to visibly indicate the adjustment of said abutment forming parts.

7. In an automatic drive, a driving member, a driven member, driving and driven friction discs contributing to form an operative connection between said members, centrifugally controlled levers to effect lateral displacement of said friction discs to automatically vary the degree of friction between them, spring means opposing displacement of said discs by said levers, and means to advance said springs relatively to said discs to compensate for wear of the discs without varying the tension of said springs.

8. In an automatic drive, a driving member, a driven member, a set of driving and a set of driven friction discs contributing to form an operative connection between said members, centrifugally controlled means to effect displacement of said friction discs to vary the degree of friction between them, pressure transmitting members co-operating with said discs, nuts non-rotatably mounted but capable of longitudinal movement and serving to movably support said pressure transmitting members, adjusting screws rotatably mounted but incapable of longitudinal movement and in threaded engagement with said nuts, springs between said nuts and said pressure transmitting members, and means to lock said adjusting screws in their adjusted positions.

9. In an automatic drive, a driving member having bearings, a driven member, driving and driven friction discs contributing to form an operative connection between said members, centrifugally controlled levers between said driving member and one of said discs and provided with fulcrums to engage said bearings, and resilient means to retain said levers in assembled position.

10. In an automatic drive, a driving member, a driven member, driving and driven friction discs contributing to form an operative connection between said members, centrifugally controlled levers to effect lateral displacement of said friction discs, said levers having one end forming a bearing fulcrum and being with said fulcrum bodily insertible into and removable from operative position, and resilient means to automatically retain said discs in declutched position until the driving member reaches a predetermined speed.

FISHER H. LIPPINCOTT.